United States Patent

[11] 3,566,239

[72] Inventor Masami Taniguchi, Tokyo, Japan
[21] Appl. No. 651,001
[22] Filed July 3, 1967
[45] Patented Feb. 23, 1971
[73] Assignee Mitsui Seiki Kogyo Co. Ltd., Tokyo, Japan

[54] AUTOMATIC FINE & COARSE POSITIONING APPARATUS BY MEANS OF NUMERICAL CONTROL FOR MACHINE TOOLS AND THE LIKE
10 Claims, 15 Drawing Figs.

[52] U.S. Cl............................................................ 318/593, 318/603, 318/640, 318/685
[51] Int. Cl........................................................ G05b 11/18
[50] Field of Search................................................ 318/(20.260)

[56] References Cited
UNITED STATES PATENTS

| | | | |
|---|---|---|---|
| 3,465,220 | 10/1969 | Rabian et al. | 318/(20.260) |
| 2,785,353 | 3/1957 | Fenemove | 318/(20.260UX) |
| 3,020,460 | 2/1962 | Morin et al. | 318/(20.260UX) |
| 3,219,894 | 11/1965 | Rosch | 318/(20.260UX) |
| 3,323,030 | 5/1967 | Inaba et al. | 318/(20.260UX) |
| 3,370,289 | 2/1968 | Hedgcock et al. | 318/(20.260UX) |
| 3,372,321 | 3/1968 | Inaba et al. | 318/(20.260UX) |
| 3,378,741 | 4/1968 | Sutton | 318/(20.260UX) |
| 3,414,785 | 12/1968 | Orattood et al. | 318/(20.260UX) |

Primary Examiner—T. E. Lynch
Attorney—Howson and Howson

ABSTRACT: Automatic positioning of a workpiece with respect to a machine tool in response to coded numerical command data is provided by a system which uses a pulse motor driving a lead screw to move the workpiece. The pulses driving the motor are counted and compared with the command data in a comparator to determine the remaining distance to the destination and to stop the pulse motor when the destination is reached. A highly accurate scale graduated in millimeters moves with the workpiece and is photoelectrically monitored to produce a scale pulse each time the workpiece moves by a millimeter. The comparator operates a gate to select the scale pulse produced by the last graduation before the destination, and the selected pulse is used to correct the accumulated count of motor-driving pulses, thus to eliminate prior errors. Subsequently, when the accumulated count equals the command data, the comparator stops the motion of the workpiece in the desired final position. The comparator also provides a controlled stepwise decrease in workpiece speed as the scale-pulse selection time and the destination are approached. An offset of a fraction of a millimeter is preferably provided for the photoelectric monitoring system to improve accuracy further.

INVENTOR:
MASAMI TANIGUCHI
BY
Howson & Howson
ATTYS.

INVENTOR:
MASAMI TANIGUCHI
BY
Howson & Howson
ATTYS.

FIG. 12.
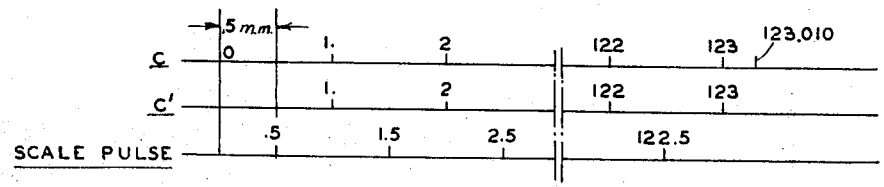
FIG. 13.
FIG. 14.
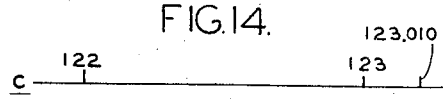
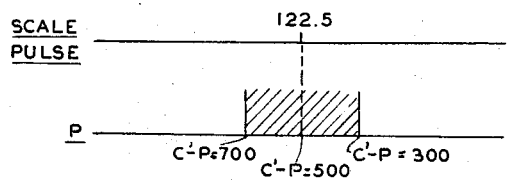
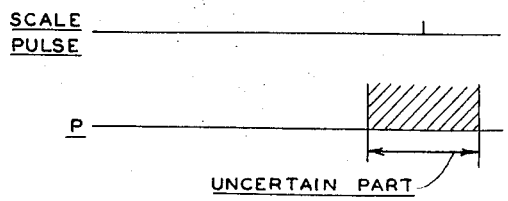
FIG. 15.
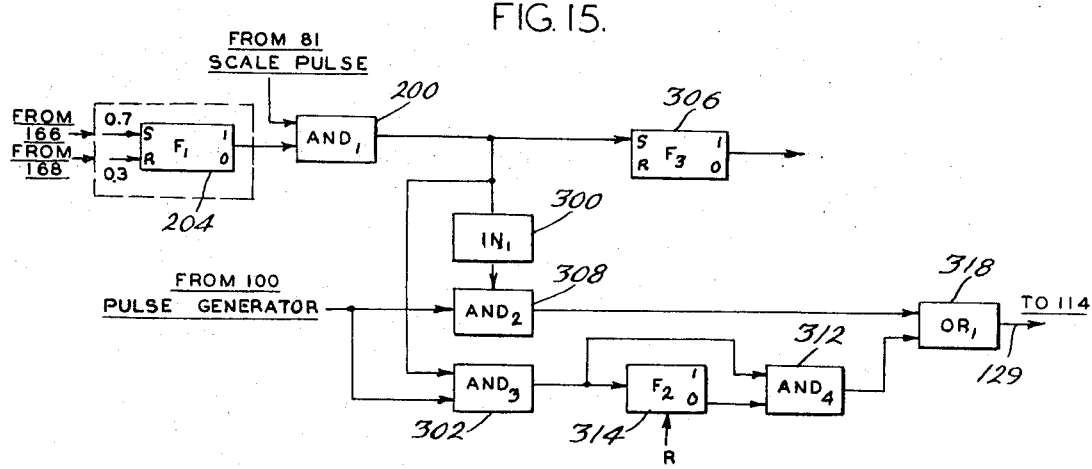
FIG. 16.
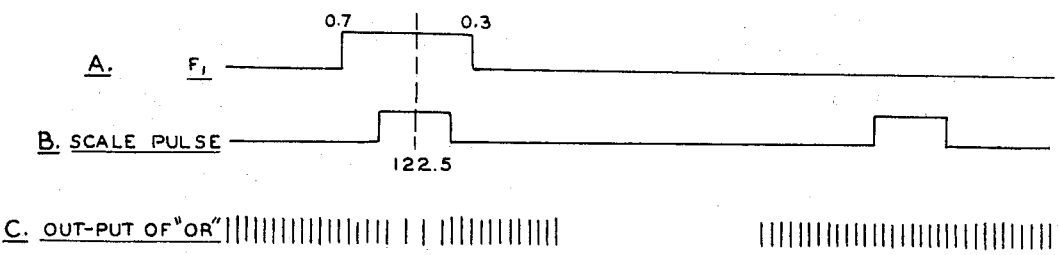
INVENTOR:
MASAMI TANIGUCHI
BY Howson & Howson
ATTYS.

AUTOMATIC FINE & COARSE POSITIONING APPARATUS BY MEANS OF NUMERICAL CONTROL FOR MACHINE TOOLS AND THE LIKE

BACKGROUND OF INVENTION

This invention relates to apparatus for automatically positioning a movable object such as a machine tool by means of numerical control, in response to input data supplied thereto, and particularly to apparatus for the automatic positioning by means of numerical control of an object which is movable along a predetermined path with a motion which is capable of being arrested when a desired position is attained.

The invention is particularly applicable to automatically-sequenced positioning of a workpiece with respect to a cutting tool. As an example, the workpiece may be affixed to a work table which is movable along a predetermined direction in a guideway in a machine bed, and a spindle head carrying the cutting tool may also be movable along a guided path at right angles to the direction of motion of the work table, so that the cutting tool may be positioned with respect to the workpiece in any desired location in a predetermined plane.

One typical example of such apparatus is an automatic jig-boring machine for making a plurality of holes in a workpiece in a predetermined geometric arrangement with respect to each other. In such a machine various types of input data are supplied to the apparatus which indicate the desired relative position of the machine tool with respect to the workpiece during a given operation, and the spindle head carrying the cutting tool or the work table is automatically moved to the desired relative position in response to said input data. The cutting tool is then lowered to the workpiece and controlled so as to perform its work operation at the desired position. Subsequently it is raised and the next desired relative motion of the tool with respect to the workpiece automatically provided, after which the next machining operation is performed on the workpiece, and so on.

Various forms of apparatus are now known in the art which attempt to perform such operations and which are successful in varying degrees. In one form of such apparatus a pulse motor is used which drives a lead screw for shifting the movable object carrying the workpiece, so that the lead screw rotates by a definite fixed angle in response to each pulse provided to the pulse motor, shifting the movable object by a corresponding fine increment of distance. Therefore automatic positioning of the object at a predetermined position may be provided by transmitting the required number of pulses to the pulse motor.

Since in such a system the pulse motor rotates the lead screw by a definite predetermined angle in response to command data, an error in the pitch of the lead screw directly influences the accuracy of the positioning—the greater the number of revolutions of the lead screw the greater the error. To avoid the increased cost of constructing a system of higher accuracy in this form, a complementary mechanism is often applied in practice to correct such error by measuring the feed precision.

Even with such a complementary mechanism, however, a change in the precision of the screw due to abrasion after long use makes it difficult to provide accurate positioning. Also, especially when the lead screw is long, friction heat generated between male and female screw threads is apt to change the length of the screw and therefore influence its precision. The temperature rise in the screw due to such heat is ordinarily approximately 2—3° C. and a screw 1 meter long, for example, elongates approximately by 1/100 millimeter for each degree centigrade of temperature rise. Because of these problems reliable automatic positioning by means of numerical control with high accuracy is very difficult to attain with such systems.

Accordingly, it is an object of the invention to provide new and useful automatic object-positioning apparatus.

Another object is to provide such apparatus which is of high precision.

A further object is to provide such apparatus which remains highly accurate and reliable even for large displacements of the object, and over long periods of time.

It is also an object to provide a new and useful automatic positioning apparatus for machine tools and the like.

SUMMARY OF THE INVENTION

These and other objects of the invention are achieved by the provision of apparatus in which an object, such as a machine tool, is caused to move along a predetermined direction by motive means, such as a pulse motor, which responds to each successive pulse applied thereto to move the object by a predetermined fine increment along said direction toward its intended destination. For example, the motive means may rotate a lead screw by a predetermined angle in response to each pulse, the lead screw in turn producing the corresponding motion of the object. The object is to be moved from an original reference position to a desired destination position in response to command-data signals representing the number of said fine increments required to move the object through the distance from its reference position to its destination position. Means are provided for counting the number of driving pulses applied to the motive means, for comparing the instantaneous total of counted driving pulses with the command-data signals, and for arresting motion of the object when the pulse count corresponds to the command data. However before the pulse count reaches the total for which arrest is produced, the count therein is automatically corrected so that immediately upon correction it very accurately represents the displacement of the object.

This correction is achieved as follows. Indicia means are provided which move with the object, the indicia means comprising a series of indicia spaced from each other along the direction of desired displacement by a coarse increment which is an integral multiple of the above-mentioned fine increment. The length of these coarse increments preferably constitutes the unit in which the higher-order digits of the command-data represent the desired displacement. By way of example only, if the desired displacement is 123.456 millimeters the higher-order digits 123 represent the desired displacement in millimeters, which are the coarse increments, the remaining lower-order digits 456 represent the additional required displacement in microns, and the entire numeral 123456 represents the total number of fine increments, or microns, of the required displacement. In this example the driving pulses would advance the object by approximately one micron each and the indicia would be spaced from each other by 1 millimeter, i.e. 1,000 microns.

Means are provided for sensing said indicia successively as they pass through alignment with a predetermined position during the displacement of the object. Comparison means are also provided which respond to the command-data signals and to the information stored in the pulse-counting means to produce an indicia-representing output pulse from the sensing means in response to a selected one of the indicia; preferably the selected indicia is the last one sensed before the object reaches its desired destination. Correcting means are provided which are responsive to the indicia-representing pulse and to the higher-order command-data representative of coarse increments to correct the count in the drive pulse counter so that it indicates accurately the number of fine increments traversed by the object up to the time of occurrence of the indicia-representing pulse. In this way any previous errors in the count, whether due to electrical counting errors or to other sources such as temperature effects on the lead screw, are eliminated. In addition, means are preferably provided which respond to signals from the comparison means to decrease the relative speed of the workpiece as it approaches its destination.

For example, in a preferred embodiment in which the moving object is a work table on a machine bed, the indicia means may be a scale member affixed to the work table and the indicia-sensing means may be an optical-photoelectric sensing system fixed with respect to the bed and used to produce an electrical graduation-representing scale pulse each time one of the graduations of the scale member is accurately aligned with the optical axis of the optical-photoelectric system. The scale member is made very accurately, and remains accurate over long periods of time since it is not subject to wear or frictionally-generated heat. Where the relative motion between the work table and the machine bed is produced by rotation of a lead screw driven by a pulse motor, the pulse motor rotates the lead screw by a predetermined angle in response to each pulse transmitted from a pulse generator. Therefore the fine increments of displacement between the work table and the machine bed may be represented by the number of pulses coming from the pulse generator.

As an example only, where the scale member may be marked with graduations spaced at 1 millimeter intervals and extending over distances of several hundred millimeters, a fine-position-indicating pulse signal is produced by the pulse generator each time the work table moves by approximately one-thousandth of a millimeter, i.e. 1 micron. A fine scale member with its graduations spaced at 1 millimeter intervals is mounted on the work table, which is movable along a guideway in a machine bed, and an electrical signal is thereby produced by the optical-photoelectric system for each passing graduation. A pulse motor is connected to said lead screw so that the work table may move by a definite fine distance, e.g. approximately 0.001 millimeter, in response to each pulse produced by the pulse generator.

The input command for the automatic positioning may be presented on tapes or dials and its number stored in registers, more particularly in one register for a portion of the number not less than 1 millimeter and in another register for the remaining portion less than 1 millimeter. When the table reaches the position for which the graduation corresponding to the portion of the command value not less than 1 millimeter is about to be sensed, as determined by automatic counting of the generator pulses, a scale-pulse gate is opened to pass the next scale pulse. The scale-pulse passed by the gate corrects the fine-pulse count, and a number of pulses corresponding to the remainder of the command value is then transmitted to the pulse motor. The pulse motor rotates in response to these pulses, driving the lead screw to displace the table by the small additional distance required to attain the desired destination position.

As a further preferred feature, an initial offset is provided between the photoelectric monitoring system and the scale-member indicia which increases system accuracy by enabling use of the last indicia before the final position to initiate the correcting operation, without danger of faulty operation for desired displacements which exceed an integral number of millimeters by only a small amount.

BRIEF DESCRIPTION OF FIGURES

Other objects and features of the invention will be more fully understood from consideration of the following detailed description, taken in connection with the accompanying drawings, in which:

FIGS. 9, 10 and 15 are schematic block diagrams showing preferred forms of three of the elements of FIG. 8; and FIGS. 11—14 and 16 are diagrams to which reference will be made in explaining the operation of the invention.

DETAILED DESCRIPTION OF PREFERRED EMBODIMENTS

Figure 1:
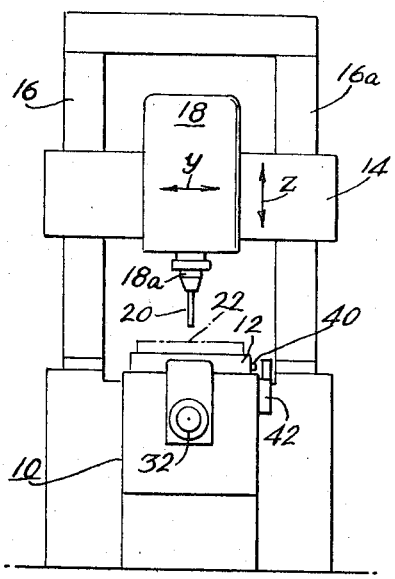
FIG. 1 is an elevation view of one type of work-processing machine to which the invention is applicable.
Figure 2:
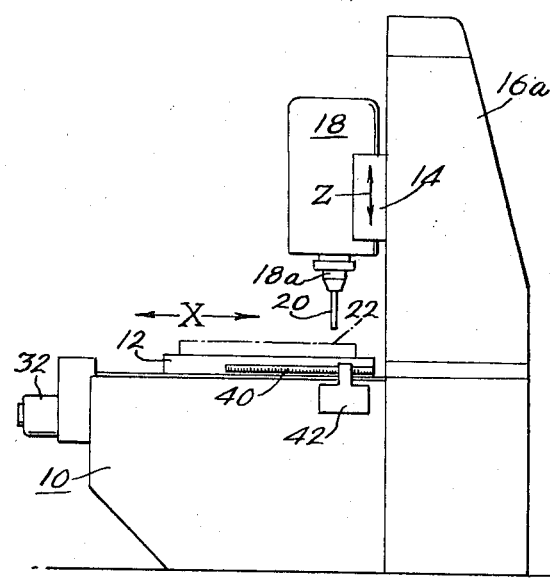
FIG. 2 is a side view of the machine of FIG. 1.
Figure 3:
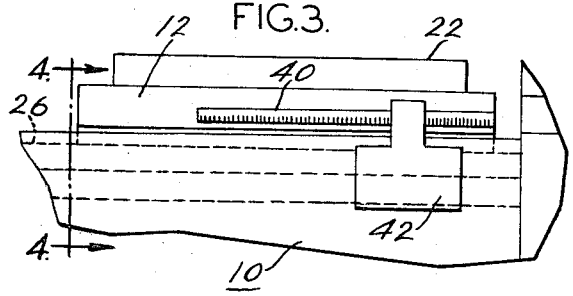
FIG 3. is an enlarged fragmentary view of a portion of the machine as shown in FIG. 2.

Referring now by way of example only to the particular embodiment of the invention illustrated in the drawings, FIGS. 1 through 6 illustrate generally one type of apparatus for boring holes in a workpiece, to which the invention is applicable. In this apparatus there is provided a machine bed 10 having a work table 12 which is slidable in a straight path on bed 10, along a horizontal axis in the plane of the paper as viewed in FIG. 2. Mounted above the machine bed is a crossrail 14 which is movable up and down along the vertical supports 16, 16a. A spindle 18 carrying a spindle head 18A is mounted on crossrail 14 so as to be movable back and forth horizontally along the crossrail, the spindle head serving to mount at its lower end a cutting tool 20 such as a bore or drill. The spindle head 18A is also controllably movable in the vertical direction. The workpiece 22, such as a body of metal into which holes are to be bored, is affixed to the top of the work table 12.

Indicating the direction of motion of the table 12 as $x$, the direction of sideways motion of the spindle head 18A as $y$, and the vertical direction of motion of the crossrail 14 and spindle head 18A as $z$, it will be appreciated that, by appropriate control of the position of the work table and spindle, the cutting tool 20 can be positioned at any desired point on the workpiece in the $xy$ plane, and by controlling the motion of the crossrail 14 and spindle head 18A in the $z$ direction the cutting tool 20 can be applied to the workpiece in a working position or raised therefrom when the workpiece is to be moved to another point in the $xy$ plane. The speed of rotation of the cutting tool can also be controlled in accordance with the type of work to be performed.

All of the above-described movements may be controlled by a computer in accordance with a predetermined program, to effect the desired treatment of the workpiece. However, for the purposes of describing the present invention it is sufficient to set forth in detail the manner in which the relative position between the table 12 and the machine bed 10 is controllably varied along the $x$ direction to provide the proper $x$ coordinate for the successive points at which machining operations are to be performed.

Figure 4:
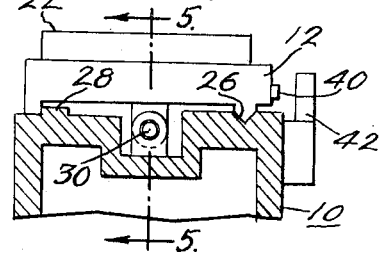
FIG. 4 is a sectional view taken on lines 4—4 of FIG. 3.
Figure 5:
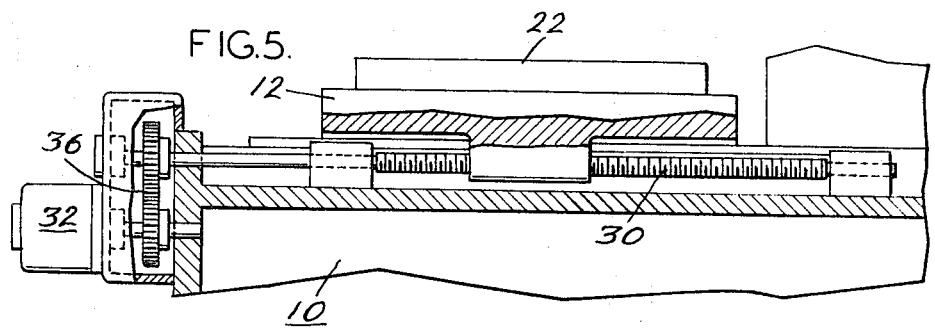
FIG. 5 is a fragmentary sectional view taken along the lines 5—5 of FIG. 4.

As it best shown in FIGS. 4 and 5, the work table 12 is arranged to be slidably mounted on the bed 10 in flat and V-shaped guideways 26 and 28, respectively, and is movable along these guideways in the $x$ direction in response to rotation of a lead screw 30 driven from a pulse motor 32 by way of suitable gears 36.

Figure 6:
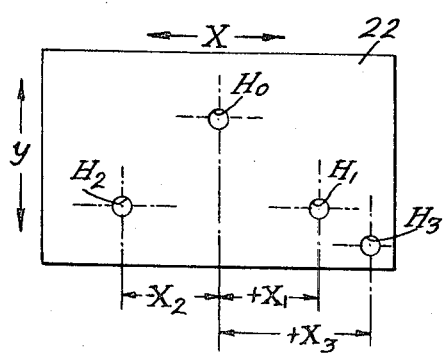
FIG. 6 is plan view of a workpiece of a type producible by the invention in one of its forms.

FIG. 6 shows workpiece 22 and a simple pattern of four holes $H_0$, $H_1$, $H_2$ and $H_3$ which it may be desired to produce in the workpiece. As shown, all four holes differ in their $x$ position, and hole $H_0$ differs also in its $y$ position from that of the other three holes; however only the position along the $x$ direction will be considered here, it being understood that similar arrangements and apparatus will normally be provided for accomplishing the corresponding necessary changes in the $y$ direction by motion of the spindle head 18A. The function of the machine in this example therefore will be, after initial positioning of the tool in direct alignment with the center of the hole $H_0$, to move the table 22 first to the left by the distance indicated as $x_1$, where hole $H_1$ is bored, and then to a position $-x_2$ to the left of the $x$ coordinate of hole $H_0$, where the hole $H_2$ is then bored, and so on.

Figure 7:
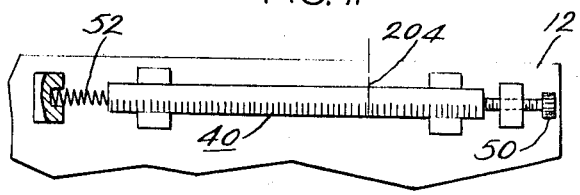
FIG. 7 is an enlarged fragmentary view of a preferred adjusting arrangement for the scale member used in the invention.

As will be described in detail later hereinafter, the desired positioning of the tool 20 is accomplished in general by deriving indications of the instantaneous position of the table along the $x$ direction as it moves, and continuing to move it until the indicated position of the work table 12 with respect to the tool 20 equals the position represented by command-input data provided by the programming of the associated computer apparatus. The position of the work table 12 with respect to the bed 10 along the x direction, and hence its position with respect to the tool 20, is indicated by signals derived from two different arrangements: first, an accurately-graduated scale member 40 affixed to the table 12 and extending along the x direction, in combination with an optical-photoelectric sensing system 42 mounted on the bed 10; and second, a generator of driving pulses for operating a pulse motor 32, which rotates the lead screw 30 by a predetermined amount for each pulse coming from the pulse generator and accordingly serves to displace the work table 12 by a small distance in either direction in response to each applied pulse. Preferably, as shown in FIG. 7, the scale member 40 is mounted for fine manual adjustment by means of a vernier set screw 50 and spring 52, for example.

Figure 8:
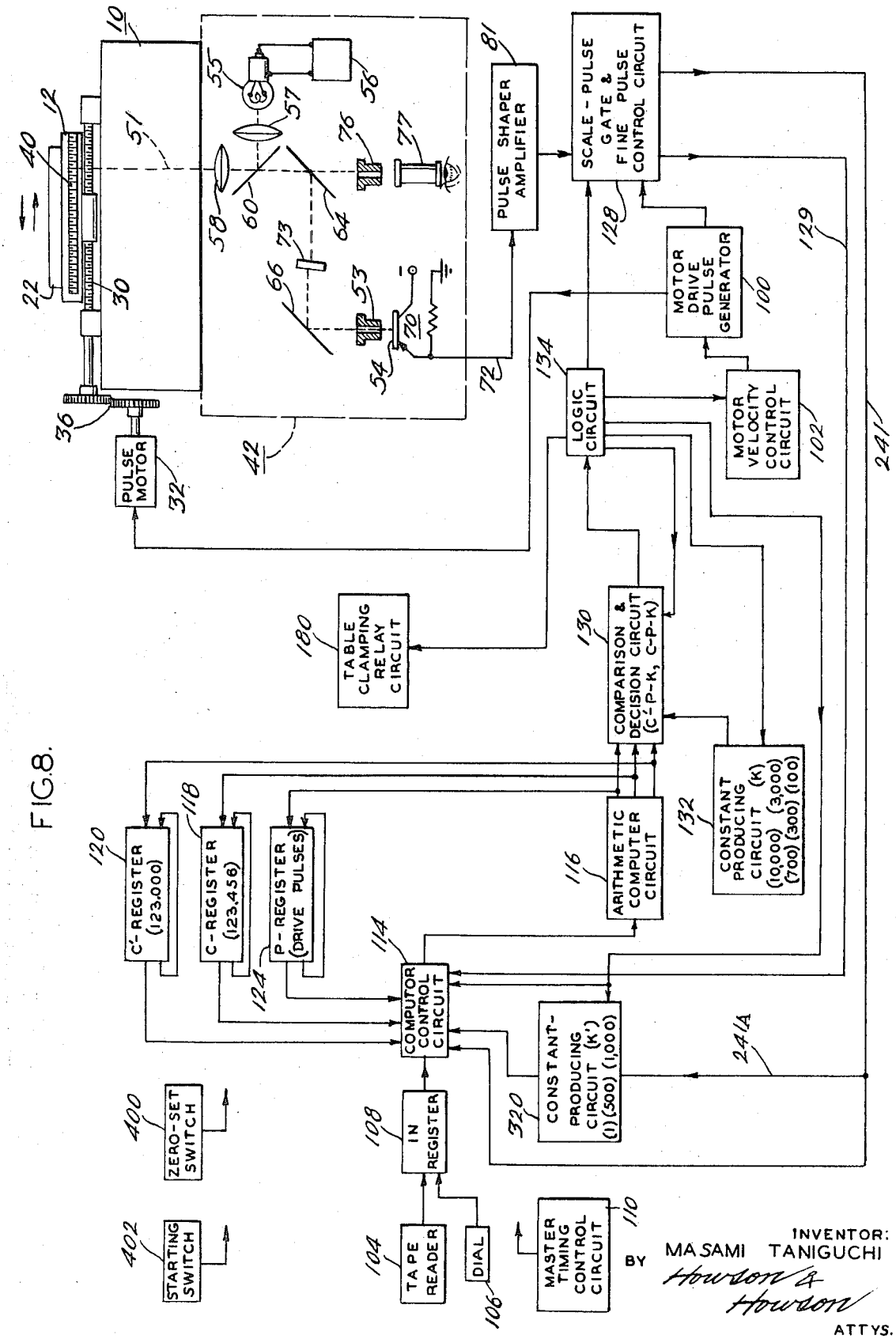
FIG. 8 is a block diagram of an automatic position-controlling system arranged in accordance with the invention.

Turning to FIG. 8, which shows the overall arrangement of a complete system in accordance with the invention in one of its possible forms, the machine bed 10, work table 12, workpiece 22, lead screw 30, pulse motor 32, gears 36, graduated scale member 40, and optical-photoelectric sensing system 42 are indicated schematically by numerals corresponding to the numerals of corresponding parts in the previously-discussed FIGS.

To detect the positions of the graduation on scale member 40 with respect to machine bed 10, an optical-photoelectric sensing system 42 having the form shown inside the dotted rectangle in FIG. 8 may suitably be employed. The overall function of the apparatus 42 is to make possible the production of an output pulse therefrom each time one of the graduations of scale member 40 coincides with the optical axis 51 of the optical-photoelectric system 42. This is accomplished, in effect, by optically forming an accurate image of the graduations of scale 40 on a slit 53 disposed in front of a photoresponsive device 54, such as a phototransistor.

In the present example the system 42 employs a light source 55 supplied with electrical current from a suitable source 56, the light from the source 55 being applied to scale member 40 by way of condensing lenses 57 and 58 and the half-reflecting, half-transmitting mirror 60. Light representing the image of scale member 40 then returns along the optical axis 51 to the slit 53 by way of the half-reflecting, half-transmitting mirrors 64 and 66. The aperture provided by slit 53 is preferably sufficiently narrow just to embrace the image of a graduation on scale member 40. A suitable supply and load circuit 70 for the photoresponsive device 54 is also provided, so that each time one of the graduations on scale member 40 passes across the optical axis 51 an electrical pulse is produced at output lead 72 of optical-photoresponsive sensing system 42.

For purposes of initial alignment described hereinafter, an additional slit 76 is preferably also provided through which an image substantially identical with that applied to the photoresponsive device may be viewed by way of a viewing instrument 77. This, for example, permits manual fine adjustment of the position of the scale member 40 so that the optical axis 51 is initially aligned exactly with an initial reference graduation on the scale member. Preferably, for reasons described hereinafter, the arrangement is such that when the initial-alignment slit 76 is exactly aligned with the image of the reference graduation, the other slit 53 is exactly aligned with the image of a point 0.5 mm. along the scale member from the reference graduation. One way to accomplish this is to insert a plane-parallel glass prism 73 between mirrors 64 and 66, at an angle and of a thickness (e.g. 3 inches) to shift the light beam by 0.5 mm. at slit 53 relative to slit 76. Various other expedients for providing this offset in viewing position for the two slits, such as fine adjustment of the spacings between the two slits and of the angles of the mirrors, will occur to one skilled in the art.

Figure 9:
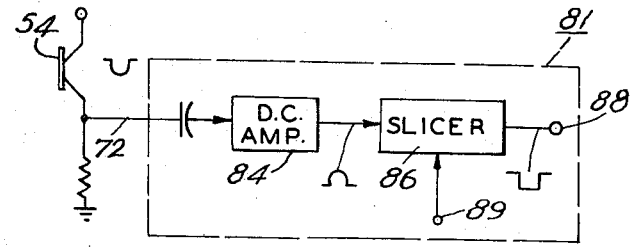

The output pulses of the optical-photoelectric graduation-sensing apparatus 42 which appear at lead 72 are preferably amplified and shaped to rectangular form by means of a pulse shaper and amplifier 81. Such arrangements are well known in the art. FIG. 9 illustrates one typical pulse shaper and amplifier circuit in which the output from lead 72 is capacitively coupled to a DC amplifier 84 and a slicer 86 having an output terminal 88, the slicer 86 also being provided with a control terminal 89 to which a variable bias voltage may be applied to vary the level at which the slicing takes place at the will of the operator.

The drive pulses operating the pulse motor 32 are supplied from a motor drive pulse generator 100, which may be a known form of ring counter, the direction of operation therein and the frequency of the pulses produced thereby both being controllable by means of a motor velocity control circuit 102. Thus, depending upon the control signals supplied thereto from the motor velocity control circuit 102, the motor drive pulse generator 100 will operate the pulse motor 32 in either of two opposite directions and at predetermined control rates. Such arrangements of controllable motor pulse generator and pulse motor being well known in the art, it will be unnecessary to set them forth in detail herein.

The displacement of the work table 12 being entirely determined by the number of pulses applied to pulse motor 32 and by the direction of its operation, the function of the remainder of the system is to control the number of pulses applied to the pulse motor 32 and its direction of operation in accordance with input command-data supplied to the system which are indicative of the desired displacement, in such manner that the operation of the pulse motor is terminated and the table 12 is clamped when the desired displacement has been attained.

The command input data may be supplied by a tape reader 104 which automatically reads out command data encoded on a tape, or alternatively by a manually operable dial 106, both of which devices may be of conventional form. For purposes of description of the principal specific preferred embodiment of the invention, it will be assumed that the desired displacement of work table 12 along the x direction is +123.456 millimeters, which is the same as 123456 microns, and that each drive pulse applied to the pulse motor 32 moves the work table by substantially one micron. Each digit of the decimal number indicating the desired displacement x is represented by a binary numeral and is received by, and stored in, the IN register 108. The binary coded decimal information in IN register 108 is subsequently processed in a manner to be described, digit by digit, in accordance with a timing sequence established and maintained by master timing control circuit 110, which also controls the timings of the operations in the entire system. The manner of providing such timing control for any desired processes being well known in the art, the details of the master timing control circuit 110 and its connections to the various elements of the system are not shown since the resultant complexity would detract from the clarity of exposition of the invention.

More particularly, the binary coded command data are supplied from IN register 108 to a computer control circuit 114 and thence to an arithmetic computer circuit 116. Computer control circuit 114 is supplied with a variety of other inputs, to be described hereinafter, and, under control of its internal connections and under control of master timing control circuit 110, selects the appropriate ones of its input signals and applies them to arithmetic computer circuit 116 in such manner that they are processed and distributed in the desired manner by arithmetic computer circuit 116. The functional nature, and the manner of construction and operation, of a suitable computer control circuit and arithmetic computer circuit will be apparent to one skilled in the art from the description herein of their functions.

In the functioning of computer control circuit 114 and arithmetic computer circuit 116 now considered, the entire binary-coded decimal 123.456 of IN register 108 is transferred to and stored in the C register 118, while the three higher-order digits, e.g. 123, are transferred to and stored in the C' register 120, e.g. the numeral 123.000 is stored therein. In the preferred embodiment this is accomplished in the manner now to be described.

It is noted that both the C' register 120 and the C register 118 have outputs feeding back into computer control circuit 114 so that the number stored in the registers can be supplied as an input data to the latter computer control circuit. Using the example of the command input data 123.456 which is to be stored in C register 118, the highest-order digit 1 (binary 0001 is first transferred from IN register 108 through circuits 114 and 116 to C register 118 and stored therein. The next highest-order binary-represented digit 2 (binary 0010) is then passed into circuits 114 and 116 along with the binary representation of the previous digit 1 from C register 118. Arithmetic computer circuit 116 then adds the binary number corresponding to the second digit to ten times the value of the first digit. The result of this computation is stored in C register 118 in place of the previous information therein. Then the binary representation of the third digit from IN register 108 is applied to computer control circuit 114 along with the information stored in C register 118, and arithmetic computer circuit 116 functions to add the value of the new digit 3 to 10 times the value of the number previously stored in the C register. When this process is completed the number stored in C register 118 is a single binary numeral having the value of the decimal 123.456, whereby the input command data is converted from binary-coded-decimal to binary form.

The basic nature of the above-described computation is indicated more clearly in the following table I in which the column headed "Input Order" represents the successive decimal values of the input command data 123.456), while the polynominals under the heading "Computation in Circuits 114 and 116" indicate the results of the successive computations leading to the final binary representation of the complete number. It will be understood that while the representation in Table I is in decimal form, both the input command data and the computed and stored numbers are processed in binary form.

TABLE I

| Input order | Computation in Circuits 114 and 116 |
| --- | --- |
| 1 | $+1$ |
| 2 | $+1 \times 10^1 + 2$ |
| 3 | $+1 \times 10^2 + 2 \times 10^1 + 3$ |
| 4 | $+1 \times 10^3 + 2 \times 10^2 + 3 \times 10^1 + 4$ |
| 5 | $+1 \times 10^4 + 2 \times 10^3 + 3 \times 10^2 + 4 \times 10^1 + 5$ |
| 6 | $+1 \times 10^5 + 2 \times 10^4 + 3 \times 10^3 + 4 \times 10^2 + 5 \times 10^1 + 6$ |

The apparatus just described may use conventional components, suitable forms of which are known to those skilled in the art. Typically the computing control circuit and arithmetic computer circuit include such devices as shift registers, binary complementing units, adders, subtractors, etc. While the registers 118 and 120 may be conventional electronic shift-type registers or nickel magnetostriction delay lines, as examples.

It will be understood that a binary numeral representing the value 123.000 is similarly formed in C' register 120, in this case the computer control circuit 114 substituting the decimal portion .000 for the decimal portion .456 in making the above-described computation.

While not pertinent to the present example of moving the work table 12 in the positive x direction by 123.456 millimeters, it is noted that computer control circuit 114 and arithmetic computer circuit 116 both may also comprise apparatus for processing negative input command data indicative of desired displacements of the work table 12 in the opposite, or negative, direction. In such case each digit of the negative number is passed through a complementing unit in the arithmetic computer circuit 116 to produce a number representing the difference between the decimal digit and ten, and each of the above-described addition steps are replaced by a subtraction step, i.e. in Table I each of the plus signs would be minus signs. The result in such case is the storage in C register 118 of a binary numeral representing 876.544, which can later be used to control the motion of the work table 12 in the negative direction as desired. In a similar manner a binary number representing 876 can be stored in C' register 120.

While C register 118 shows at any time the desired displacement of the work table 12, P register 124 stores at any time the number of microns of displacement which have taken place, at least approximately. This is accomplished by supplying a pulse from motor drive pulse generator 100 to a scale pulse gate and fine pulse control circuit 128 each time that a drive pulse is applied to pulse motor 32, the scale selector and fine pulse control circuit 128 serving, in effect, to transfer the drive pulses from generator 100 over line 129 to computer control circuit 114 and arithmetic computer circuit 116 and thence to P register 124; P register 124 transfers its output to computer control circuit 114 each time a new drive pulse is received over line 129 and arithmetic computer circuit 116 adds one to the count previously in the P register for each such successive drive pulse. Accordingly, the motor drive pulses are, in effect, counted and stored in P register 124 as they occur. As will be described later, the scale-pulse gate and fine pulse control circuit 128 also participate in a process whereby, upon sensing of a particular graduation on the scale member 40 (preferably the graduation sensed just prior to displacement by the whole number of millimeters of the desired displacement) the count in P register 124 is corrected automatically to eliminate errors from electrical and mechanical sources.

Computer control circuit 114 is also controllable to supply the value P stored in P register 124, and either the value C' in register 120 or the value C in register 118, through arithmetic computer circuit 116 to comparison and decision circuit 130. Comparison and decision circuit 130 has the characteristic of computing the difference $C'-P$ or $C-P$ for each successive value of P as it changes upon motion of the work table or otherwise, and comparing the resultant differences with constant values K supplied thereto from constant-producing circuit 132. For reasons which will become more apparent hereinafter, the constant-producing circuit 132 is controllable to produce a number of different constants at different times, in the present embodiment these constants being 10,000, 3,000, 700, 300 and 0. More particularly, the comparison and decision circuit 130 produces an output indicative of whether the difference $C'-P$, is greater than, or is not greater than, the constant then being supplied by constant-producing circuit 132. The results of these comparisons and decisions are transmitted in binary form to logic circuit 134 to control operations described hereinafter.

The comparison and decision characteristics and operating sequence of circuit 130 are indicated by the following Table II which indicates under the heading "Decision" the results of comparing the values of the constant K with the differences $C'-$ and $C-P$ for seven different positions of the work table 12. The column headed "Significance" indicates the significance of these decision in terms of the position of the work table with respect to its final destination and with respect to the times at which certain other functions, particularly the selection of the scale pulse, are performed.

TABLE II
d=a distance less than 1 mm.

| Table position No. | | Decision | Significance |
| --- | --- | --- | --- |
| | | <10,000 | Destination assumed to be in negative direction. |
| | (1) | >10,000 | Destination lies in positive direction. |
| | (2) | =10,000 | Destination is 10 mm. +d away in positive direction. |
| (C'−P) | (3) | =3,000 | Destination is 3 mm. +d away in positive direction. |
| (C'−P) | (4) | =700 | Scale pulse gate is to be opened. |
| (C'−P) | (5) | =300 | Scale pulse gate is to be closed. |
| (C−P) | (6) | =100 | Destination is 100 microns away in positive direction. |
| (C−P) | (7) | =0 | Destination attained. |

Figure 10:
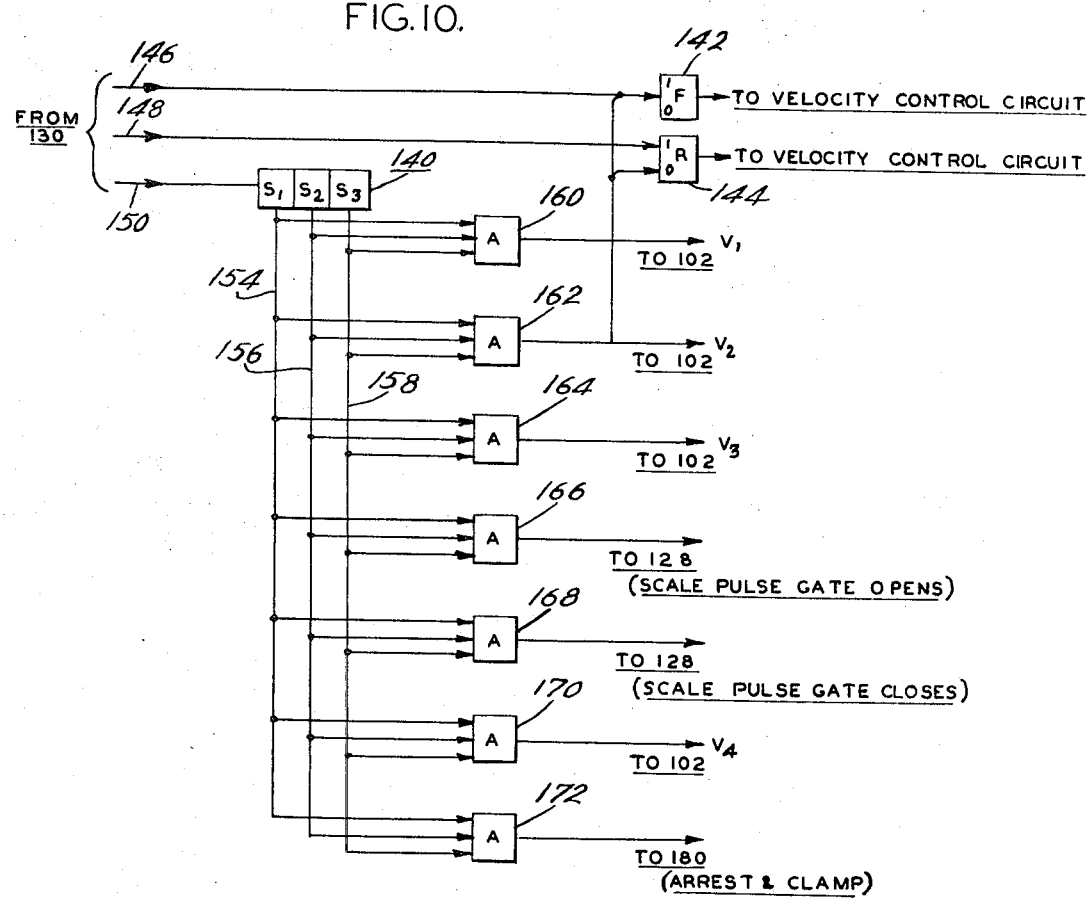

Binary information as to the decisions made in comparison and decision circuit 130 is supplied to logic circuit 134, which may for example include the circuit illustrated in FIG. 10. This comprises a sequence counter 140 containing three flip-flops $S_1$, $S_2$ and $S_3$, a positive-storage flip-flop 142, designated F because when in its 1 state it produces "forward" (i.e. positive) table motion, and a negative-storage flip-flop 144, designated R since when in its 1 state it produces reverse (i.e. negative) table motion. Comparison and decision circuit 130 in this example provides information over line 146 to positive-storage flip-flop 142 and over line 148 to negative-storage flip-flop 144 to change them from their 0 to their 1 states, and over line 150 to sequence counter 140 to produce a progressive count therein as the table reaches certain positions with respect to the destination.

The flip-flops of the sequence counter are connected together in the usual way for such counters, the count beginning in $S_1$. All three respective output lines 154, 156 and 158 of flip-flops $S_1$, $S_2$ and $S_3$ are connected to each of the seven condition-sensing circuits 160, 162, 164, 166, 168, 170 and 172. Designating the two states of each flip-flop as 0 and 1, $S_1$, $S_2$ and $S_3$ count from binary 000 to binary 111. Condition sensors 160, 162, 164, 166, 168, 170 and 172 each produce an output only for the following conditions of $S_3$, $S_2$, $S_1$, respectively: (001), (010), (011), (100), (101), (110), (111).

The following Table III shows the relation between the states in logic circuit 134 and the position and motion of table 12.

TABLE III

| Decision | F | B | $S^3$ | $S^2$ | $S^1$ | Effect on Table 12 |
|---|---|---|---|---|---|---|
| Initial condition | 0 | 0 | 0 | 0 | 0 | Clamped and arrested. |
| <10,000 | 0 | 1 | 0 | 0 | 1 | Reverse motion at $v_1$. |
| >10,000 | 1 | 0 | 0 | 0 | 1 | Forward motion at $v_1$. |
| =10,000 | 1 | 0 | 0 | 1 | 0 | Forward motion at $v_2$. |
| =3,000 | 1 | 0 | 0 | 1 | 1 | Forward motion at $v_3$. |
| =700 | 1 | 0 | 1 | 0 | 0 | No change in velocity (scale pulse gate opens). |
| =300 | 1 | 0 | 1 | 0 | 1 | No change in velocity (scale pulse gate closes). |
| =100 | 1 | 0 | 1 | 1 | 0 | Forward motion at v. |
| =0 | 1 | 0 | 1 | 1 | 1 | Arrest and clamp table. |

Accordingly, motor velocity control circuit 102 is supplied with the outputs of condition-sensors 160, 162, 164 and 170; scale-pulse gate and fine pulse control circuit 128 is supplied with the outputs of condition-sensors 166 and 168; and the output of condition-sensor 172 is supplied to table-clamping relay circuit 180, which responds to clamp the table 12 during the machining of the workpiece.

Logic circuit 134 also provides control signals to constant-producing circuit 132 and to comparison and decision circuit 130 to control switching of the value of the constant K and switching between the input values C' and C at the appropriate times to enable the desired comparison in circuit 130. Apparatus suitable for such purposes may be conventional in form.

Motor-velocity control circuit 102 responds to the command signals from logic circuit 134 to change the frequency and sense of pulse generation in motor drive pulse generator 100. As mentioned previously, generator 100 may comprises a conventional ring counter which is reversible so as to rotate pulse motor 32 in one sense when F is in its 1 state and in the opposite sense when R is in its 1 state. The frequency of the pulse generator and the speed of table 12 in a typical example may be as shown in Table IV.

TABLE IV

| Command | Frequency of generator 100 | Speed of table 12 |
|---|---|---|
| $v_1$ | 25 K.C./Sec. | 1,500 m.m./min |
| $v_2$ | 2.5 K.C./Sec. | 150 m.m./min |
| $v_3$ | 500 c/Sec. | 30 m.m./min |
| $v_4$ | 25 c/Sec. | 1.5 m.m./min |
| Stop | 0 c/Sec. | 0 |

Figure 11:
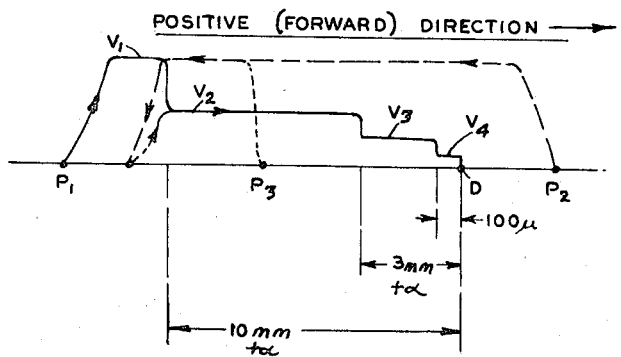

Fig. 11 illustrates the velocity-control operation of the system in one preferred form. In the case of a starting point $P_1$ for which the destination D is in the positive direction and more than 10,000 mm. away, motion is in the positive direction throughout, first at $v_1$, then at progressively lesser speeds $v_2$, $v_3$ and $v_4$ as the destination is approached, so that accurate arresting and accurate operation of the scale gate can be effected. If the initial point is at $P_2$, so that the destination D is in the negative direction, motion is initially in the negative direction as represented by the broken line, until a position is reached at which D is 10,000 mm. in the positive direction, at which time the direction of motion reverses and the previously-described approach to D is repeated. A similar sequence occurs when the starting point is at $P_3$, for which D is in the positive direction but nearer than 10 mm., as shown in broken line in FIG. 11.

As illustrated in FIG. 10, the Set input for flip-flop 142 and the Reset input for flip-flop 144 may be connected to the output of condition-sensor 162, so that when motion of the table 12 in the reverse direction has moved it to the positive 10 mm. point the output from sensor 162 will set the flip-flop 142 and reset the flip-flop 144 to cause the table to move in the positive (forward) direction, at the speed $v_2$ as shown in FIG. 10. Reset for both flip-flops may be provided at the end of each machining operation by master timing control circuit 110.

The scale-pulse gate in scale-pulse gate and fine pulse control circuit 128 is opened to control signals from logic circuit 134 in the present example only when a value of the difference C'−P between 700 and 300 is detected. While the relatively-large range from 700 to 300 is not required to accommodate the duration of the scale pulse, which occupies a very small fraction of the time required to pass from 700 to 300, it provides a useful margin for error so that the scale pulse is sure to be passed by the scale-pulse gate despite possible errors in the value of P stored in register 124; it also allows time for the transition in velocity from $v_2$ to $v_3$ to be fully accomplished before the scale-pulse gate opens.

Preferably, in the present example the initial reference position of the table 12 is such that the axis of the optical-photoelectric system is aligned halfway between the successive millimeter graduations, e.g. in alignment with a position such as 204 in FIG. 7. The result of this arrangement is that scale pulses are produced by the first millimeter graduation after the table 12 has moved 0.5 mm., rather than 1 mm., and successive scale pulses occur when the table has moved by 1.5 mm., 2.5 mm., 3.5 mm. etc. as shown in FIG. 12. In the latter FIG. the lines C and C' are marked to indicate the possible values of the table displacement, in this case it being assumed for purposes of explanation that the value in the C register is 123.010 and that in the C' register is 123. The third line in FIG. 12 is marked to show the values of displacement for which scale pulses are produced, viz. 0.5, 1.5, 2.5 etc.

FIG. 13 illustrates the time at which the scale-pulse gate is open. The first line thereof indicates the stored value of C, 123.010 mm. in this example; the second line indicates the table displacement for which the selected scale pulse is produced, viz. 122.5 mm.; the third line indicates by the cross-hatched region the table displacements for which the scale-pulse is open. The time at which a scale pulse passes through the scale-pulse gate is therefore an accurate indication of when a table displacement of C'−0.5 mm. has occurred, in this example 122.5. As will be explained more fully later herein, the scale-pulse is used to set the P register count to 122.5 to correct any accumulated errors therein, by way of line 241 and computer control circuit 114 in FIG. 8.

FIG. 14 illustrates the difficulty which may arise in the present example if the optical-photoelectric system is not off-set by 0.5 mm. The three lines of FIG. 14 have the same significance as in FIG. 13. Assume that the desired destination is 123.010 and that the last-occurring scale graduation 123 is used to produce the scale-pulse. In this case the scale-pulse gate is balanced about the C' value of 123. If the scale-pulse occurs after the desired displacement 123.010 has been reached, or even slightly before that, it will be too late to make the desired correction of the P register count and proper operation will not be obtained. For this reason it is preferred to use an offset (e.g. 0.5 mm.) large enough to ensure that the scale-pulse gate will have closed well before the displacement C' has occurred. On the other hand, if the earlier scale graduation is used, again without offset, there will be time to complete the desired correction but in some cases (such as a destination of 123.999) there will be nearly a whole millimeter of motion after correction. The longer the interval after correction the less the accuracy. The use of offset therefore makes it possible to make the correction early enough to be reliable for all destinations but late enough to maximize the accuracy of the system.

In the following it is again assumed that the desired displacement is 123.456, rather than the 123.010 assumed in explaining the reason for zero-reference offset.

A preferred form for the scale-pulse gate and fine pulse control circuit 128 is shown in FIG. 15. Scale pulses from amplifier 81 are supplied to one input terminal of AND gate 200, the other input terminal of which is supplied with the output of flip-flop 204. The Set and Reset terminals of flip-flop 204 are supplied respectively from condition sensors 166 and 168 of FIG. 9. Accordingly, while scale-pulse is applied to AND gate 200 each time the axis of the optical-photoelectric system is aligned with one of the scale graduations, AND gate 200 delivers an output pulse only for that scale-pulse which occurs contemporaneously with an output pulse from flip-flop 204, e.g. when $C'-P$ is between 700 and 300.

The output of AND gate 200 is supplied in parallel to an inverter 300, an AND gate 302 and to the Set input terminal of a flip-flop 306. The output of inverter 300 is supplied to one input of an AND gate 308. The other input terminals of AND gates 308 and 302 are supplied with pulses from motor drive pulse generator 100. The output of AND gate 302 is supplied in parallel to one input terminal of AND gate 312 and to the input terminal of a 2:1 count-down flip-flop 314. The output of the count-down flip-flop 314 is supplied to the other input terminal of AND gate 312, and the outputs of AND gates 312 and 308 are supplied to the respective input terminals of OR gate 318.

In the operation of the circuit of FIG. 15, in the absence of a scale-pulse from AND gate 200 the output of inverter 300 permits an output pulse to be produced by AND gate 308 for each input pulse from pulse generator 100. These output pulses are supplied to, and produce a corresponding series of pulses from, OR gate 318, which pulses are supplied to line 129 and ultimately counted and stored in P register 124.

However, when the occurrence of the value $C'-P = 700$ causes the flip-flop 204 to be set, the output from AND gate 200 produced in response to the next scale-pulse operates inverter 300 to prevent output from AND gate 308. At the same time, the output of AND gate 200 during the scale-pulse permits AND gate 302 to produce an output for each pulse supplied thereto from pulse generator 100. Count-down flip-flop 314 responds to such pulses by alternating between its 1 and 0 states in response to successive input pulses from AND gate 302. Accordingly AND gate 312 produces an output pulse in response only to every other one of the input pulses supplied thereto directly from AND gate 302. The output pulses from AND date 312, which therefore occur at half the rate of the pulses from pulse generator 100, are supplied to, and pass through, the OR gate 318 and ultimately to the P register 124.

Also, when the beginning of the scale-pulse first causes an output from AND gate 200 the flip-flop 306 is immediately actuated from its 0 to its 1 state and supplies a control voltage over lines 241, 241A to the constant-producing circuit 320 to cause the latter circuit to generate a constant value of 500 which is supplied to computer control circuit 114. The latter circuit responds to produce from arithmetic computer circuit 116 a value equal to $C'-500$ and to store this value in P register 124 in place of the fine-pulse count previously stored therein. In the present example, the value $123.000 - 0.500$, or 122.5 mm., is placed in the P register.

The nature and significance of the above-described circuit for producing fine pulses at half the normal rate during the scale-pulse interval will be more fully appreciated from a consideration of FIG. 16, wherein the first graph A represents the scale-pulse gate interval, the second graph B represents the scale-pulse, and the third graph C represents the fine-pulse output of the OR gate of FIG. 11; it will be understood that the time intervals shown are not to scale, the duration of the scale-pulse and the time between fine pulse being much shorter in relation to the scale-pulse gate interval than is shown. It will be recalled that the center of the scale-pulse corresponds with a displacement of table 12 of $C'-.500 = 122.5$ mm. in the present example, and accordingly if the count in the P register 124 is corrected to 122.5 at the beginning of the scale-pulse it will be in error by half the number of fine pulses which would normally occur during the scale-pulse. By reducing by one-half the number of fine pulses supplied to the P register during the scale-pulse, the count in the P register is caused to be correct by the time the scale-pulse is finished.

When the scale-pulse gate is again closed, logic circuit 134 acts on computer control circuit 114 to cause comparison of $C-P$ with the value 100 in circuit 130 until $C-P = 100$, at which time the table velocity is decreased to $v_4$; when $C-P = 0$, logic circuit 134 stops application of motor drive pulses to the pulse motor 32, and actuates table-clamping relay circuit 180 shortly thereafter to clamp the table.

The timing of all of the aforedescribed operations are controlled by the master timing control circuit 110 which is connected appropriately to each part of the system to produce the proper sequences of reading-in of the command values, computation and storage, as well as switching functions. Detailed apparatus for producing such timing control being well known in the art, it will not be described here in detail.

Preferably also provided are a zero-set switch 400 which, when actuated, sets the P register to 0 when the table 12 is in its initial position and also may be used to provide other reset functions throughout the system; and starting switch 402 which, when actuated, initiates each new positioning cycle. The connections of these elements into the system may also be conventional.

In operation of the complete system, the workpiece is placed in position to bore the hole $H_0$ and the scale 40 is adjusted by knob 50 until a graduation is viewed at the center of slit 76. When starting switch 402 is actuated the command value from tape reader 104 or dial 106 is stored in IN register 108, after which time read-in stops. Timing signals from master timing control circuit 110 cause the numerical information stored in IN register 108 to be processed in computer control circuit 114 and arithmetic computer circuit 116 and stored in C register 118 in binary form. When this process is completed, master timing control circuit 110 then causes the portion of the command value representative of whole numbers of millimeters, namely 123.000 to be stored in the C' register 120 in binary form. When this process has been completed, a command signal from master timing control circuit 110 causes a computation of $C'-P$ and a comparison of this difference with 10,000 in comparison and decision circuit 130. When $C'-P$ is greater than or equal to 10,000 logic circuit 134 causes the table-clamping relay circuit 180 to release the table 12 and produces a command to motor-velocity control circuit 102 to operate the motor drive pulse generator 100 in the positive direction at 25 kc. per second, whereby the pulse motor 32 is operated to displace the table 12 in the positive direction at a velocity $v_1$.

The first pulse from motor drive pulse generator 100 is supplied through scale-pulse gate and fine pulse control circuit 128, lead 129, computer control circuit 114 and arithmetic computer circuit 116 to increase the value in P register 124 by one. As soon as this process is completed, $C'-P$ is recomputed and the process is repeated until the difference $C'-P = 10,000$, at which time logic circuit 134 causes motor drive pulse generator 100 to operate at 2.5 kc. per second and the table 12 to move at a velocity $v_2$; at the same time, the constant produced by constant-producing circuit 132 is changed from 10,000 to 3,000 and the difference $C'-P$ is compared with 3,000. The above-described operations are then repeated until $C'-P = 3,000$ at which time pulse generator 100 is caused to operate at 500 cycles per second 3; the table 12 is driven at a velocity $v_3$; constant-producing circuit 132 then transmits the constant 700 to comparison decision circuit 130 for comparison with C'−P.

When C'−P =700, logic circuit 134 causes the scale-pulse gate of scale-pulse gate and fine pulse control circuit 128 to open, and causes constant-producing circuit 132 to transmit the value 300 to the comparison and decision circuit 130 for comparison with C'−P. When a scale pulse from amplifier 81 arrives at scale-pulse gate and fine control circuit 128 while the scale pulse gate is open, constant-producing circuit 320 causes the computation of C'−500, P register 124 is cleared, and C'−500 st stored therein. Fine pulses from scale pulse gate and fine pulse control circuit 128 are thereafter added to the value in P register 124 as described previously, and the difference C'−P compared with the constant 300 following each fine pulse. The fine pulses are recurrent at one-half the normal rate until C'−P =300, at which time logic circuit 134 causes the scale pulse gate to close and the fine pulses recur again at their normal rate and are added into the P register 124. However, now C −P is computed, instead of C'−P, and is compared with the constant 100 from constant-producing circuit 132.

When C −P =100, logic circuit 134 causes the motor drive pulse generator 100 to oscillate at 25 cycles per second and to move table 12 at velocity $v_4$. The difference C −P is computed for each successive pulse and compared with 0 in comparison and decision circuit 130.

When C −P 0, logic circuit 134 causes pulse generator 100 to stop oscillating and pulse motor 32 therefore also terminates its rotation and table 12 is arrested. Logic circuit 134 then causes table-clamping relay circuit 180 to clamp the table in fixed position and the desired machining operation, such as boring of a hole, is then performed on the workpiece. Master timing control circuit 110 then clears all of the memory circuits except for the values stored in C' register 120, C register 118 and P register 124, which are retained. When motion to the next working position is to be provided, the command-data are added into the C register and the C' register and the above-described general process repeats.

If the destination is in the positive direction but less than 10,000 microns away, the table first moves in the negative direction until the destination is more than 10,000 microns away and then the above process automatically occurs.

It will be understood that in one possible form of the invention the completion of the machining operation at one destination point may be used to signal a complete clearing of the system and an automatic return to the original indexing point, from where repositioning to the next working operation will be made. Also, it may be arranged to start the work table at one extreme and program the tape input so that motion from hole-position to hole-position is always in the positive direction. In either of these arrangements the circuitry of the system is substantially simplified, since no negative command data need be used. However, if motion to destinations in both the positive and negative directions are desired, then some further provision should be made.

If the desired destination is in the negative direction, as represented by a negative command number such as −123.456, the computations and control functions are most easily performed by forming the binary complement of the command number for storage in the C and C' registers and using the binary complement for comparison purposes. Changeover from the operation required for positive command data to that required for negative command data is produced through control by master timing control circuit 110. For example, the complement of −123.456 (i.e. 876.544) is formed and placed in the C register in binary form. Since this involves addition of binary 1 to the binary complement of each decimal digit of the command number, constant-producing circuit 320 provides a binary 1 to computer control circuit 114 when required for this purpose.

Referring to FIG. 11, it will be seen that, for a negative command number, 1.000 should be added to the stored value of C'. This is because the desired destination −123.456 is being approached from the larger-number side, i.e. in the order −127, −126, −125, −124, −123.456. Accordingly, instead of reaching −123.456 by moving to the −123rd millimeter position and then −.456 mm. further, movement is provided to the −124th mm. position and then −.544 further, which is made possible by the addition of .000 from constant-producing circuit 320 and by the forming of the complement .544 of the .456 portion of the original command number −123.456.

Since computer theory and equipment for providing such operations are well known, they will not be described here in detail.

While the invention has been described with particular reference to specific embodiments thereof, it may be embodied in any of a variety of forms differing from those specifically described and claimed without departing from the spirit and scope of the invention as defined by the appended claims.

I claim:

1. Apparatus for automatically displacing one object with respect to another object, along a predetermined coordinate direction, from a reference position to a destination position comprising:

screw means responsive to rotation thereof to move said first object along said direction;

pulse motor means responsive to successive driving pulses to rotate said screw means and move said one object along said direction by substantially a predetermined amount in response to each of said pulses in a directional sense determined by a predetermined characteristic of said pulses;

a source of driving pulses and means for applying them to said pulse motor means to move said one object, said source being controllable to determine the rate of generation of said pulses and to control said predetermined characteristic of said pulses, thereby to control the rate and directional sense of motion of said one object;

counting means responsive to said pulses from said source for accumulating number information in digital form representative of a net count of said pulses, those of said pulses which move said one object in one directional sense being effective to increase said count and those which move said one object in the opposite sense being effective to decrease said count;

command-data input means for providing and storing command number information in digital form representative of the magnitude of the desired displacement of said one object from said reference position to said destination position;

computer means responsive to said command number information and to said accumulated number information for controlling said source of driving pulses to move said one object to said destination position and for arresting said one object at said destination position; and means for correcting said accumulated number information prior to reaching said destination point thereby more accurately to represent the instantaneous position of said one object as it approaches said destination point, said correcting means comprising indicia means and indicia-sensing means, one fixed with respect to said one object and the other fixed with respect to said other object, said indicia-sensing means producing signals in response to sensing of said indicia, signal gating means responsive to said accumulated number information for selecting a signal from said indicia-sensing means produced by the last one of said indicia sensed prior to reaching said destination point; and means for utilizing said selected signal to correct said accumulated number information, said indicia means comprising an accurate scale member fixed to said one object and said indicia-sensing means comprising optical-photoelectric means for sensing when any of said indicia occupy a predetermined position, said computer means being responsive to said corrected accumulated number information to move said one object to said destination position after said correcting occurs.

2. Apparatus in accordance with claim 1, comprising means for providing an offset between said indicia means and said indicia-sensing means at the beginning of said displacing of said one object, such that said signals produced by said indicia-sensing means occur for values of said displacement differing substantially from integral multiples of the distance between said indicia.

3. Apparatus in accordance with claim 2, in which said offset is substantially equal to one-half the distance between successive ones of said indicia.

4. Apparatus for automatically displacing an object by a controlled distance, from a reference position to a desired destination position, comprising:

screw means responsive to rotation thereof to move said first object along said direction;

pulse motor means responsive to successive driving pulses for moving said object from said reference position toward said destination position by fine increments of said distance;

a source of driving pulses and means for applying them to actuate said pulse motor means;

a source of command-data signals representing the required number of said fine increments to move said object by said distance, said signals representing said number in terms of a multidigit numeral;

first storage means responsive to said command-data signals for storing information as to the values of higher-order digits of said numeral and second storage means responsive to said command-data signals for storing information as to the values of all digits of said numeral;

means for counting said driving pulses and for providing stored information representative of the total number P of said pulses applied to said pulse motor means during said displacement:

means for comparing said number P with said required number of fine increments and for arresting said displacement of said object when said number P and said required number are equal;

indicia means moving with said object and comprising a series of indicia spaced from each other along the direction of said displacement of said object by a coarse increment which is an integral multiple of said fine increment, the integral number of said coarse increments in said displacement being represented by said higher-order digits;

means for sensing said indicia successively as they pass through alignment with a predetermined position during said displacement of said object;

means responsive to said command-data signals and to said stored information from said counting means for producing an indicia-representing pulse from said sensing means in response to a selected one of said indicia; and means responsive to said indicia-representing pulse and to said information stored in said first storage means for correcting said number P stored in said counting means to indicate substantially exactly the number of said fine increments traversed by said object up to the time of occurrence of said indicia-representing pulse, and for thereafter applying to said pulse motor means the correct number of pulses to move said object to said desired destination position.

5. Apparatus in accordance with claim 4, wherein said selected one of said indicia is the last of said indicia to be sensed prior to displacement by the distance indicated by said higher-order digits, and wherein said sensing means is offset from said indicia by a predetermined amount when said displacement is begun whereby said indicia-representing pulse and said correcting are produced prior to displacement of said object by the distance represented by said higher order digits.

6. Apparatus in accordance with claim 5, comprising means for reducing the rate of application of said driving pulses to said pulse motor means after said correcting, thereby to slow down said displacement of said object as it approaches said destination position and to permit more accurate arresting thereof.

7. Automatic positioning apparatus for displacing one object with respect to another object by a controlled distance, comprising:

screw means responsive to rotation thereof to move said one object with respect to said other by an amount which is nominally the same for each rotation of said screw means;

pulse motor means for rotating said screw means by a predetermined angular increment in response to each driving pulse applied to said pulse motor means thereby to provide movement of said one object by a fine increment of said distance in response to each said pulse;

command-data input means for supplying numerical data representing said distance;

means for applying driving pulses to said pulse motor means;

means for counting said driving pulses and producing signals representative of the count accumulated therein;

indicia means and indicia-sensing means, one of said two last-named means being fixed with respect to said one object and the other being fixed with respect to said other object, said indicia means comprising graduations spaced-apart from each other by coarse increments large compared with said fine increments of distance, said indicia-sensing means being normally inhibited from operating but responsive to a gating signal applied thereto to become operative during a limited time interval to produce a graduation-indicating signal when one of said graduations becomes aligned with said indicia-sensing means during said time interval;

means responsive to said count-representing signals and to said distance-representing numerical data to generate and apply said gating signal to said indicia-sensing means during a time embracing the expected time of alignment with said indicia-sensing means of one of the last of said indicia-means to become so aligned prior to displacement of said one object by said controlled distance, thereby to produce an indicia-representing signal accurately representative of the distance by which said one object has thus far been displaced;

means for determining from said indicia-representing signal and from said numerical data the additional number of said driving pulses required to move said one object through the remaining portion of said distance; and means for thereafter applying said additional number of said pulses to said pulse motor means to complete displacement of said one object by said controlled distance.

8. Apparatus in accordance with claim 13, in which said correcting signal is produced in response to the last one of said indicia sensed by said sensing means prior to displacement of said one object by the distance represented by higher-order digits of said command-data.

9. Apparatus in accordance with claim 8, in which said offset is substantially equal to one-half the distance between successive indicia of said indicia means.

10. Apparatus for the automatic positioning of machine tools, measuring devices and the like by moving a first body with respect to a second body along a predetermined path and through a predetermined distance, comprising:

screw means responsive to rotation thereof to move said body along said path;

pulse motor means connected to said screw means for rotating said screw means by a predetermined angular amount in response to each driving pulse supplied thereto, thereby to move said first body along said path by a fine increment in response to each of said pulses;

means for applying driving pulses to said pulse motor means to rotate said screw means and to move said body through said distance in said fine increments;

means for controlling the number of said driving pulses to be applied to said pulse motor means in such manner as to arrest said rotation of said screw means when said first body has moved through substantially said predetermined distance;

said pulse-number controlling means comprising a scale member fixed with respect to one of said bodies and having graduation spaced from each other by coarse increments large compared with said fine increments, optical-photoelectric graduation-sensing means fixed with respect to the other of said bodies for sensing said graduations to produce an electrical signal when any one of said graduations attains a predetermined position with respect to said second body, means for normally inhibiting operation of said graduation-sensing means, means responsive to said driving pulses for enabling operating of said graduation-sensing means during an interval embracing the expected time of occurrence of that electrical signal produced by the last graduation to attain said position prior to completion of motion of said first body through said predetermined distance, means responsive to said electrical signal to correct the number of additional driving pulses to be applied to said pulse motor after said correcting, and means for applying said corrected number of pulses to said pulse motor.

UNITED STATES PATENT OFFICE
CERTIFICATE OF CORRECTION

Patent No. 3,566,239  Dated February 23, 1971

Inventor(s) Masami Taniguchi

It is certified that error appears in the above-identified patent and that said Letters Patent are hereby corrected as shown below:

Column 7, line 22, before the sentence, "When this p... ...", insert --This process is repeated for each digit in register 108, arithmetic computer circuit 116 in each case functioning to add each newly-received digit value to ten the value of the number previously stored in the C register Column 9, Table III, second to the last line, change to --$v_4$--.

Column 9, line 57, change "comprises" to --comprise--.

Column 11, line 56, change "date" to --gate--.

Column 16, line 44, change "13" to --7--.

Signed and sealed this 28th day of December 1971.

(SEAL)
Attest:

EDWARD M. FLETCHER, JR.  ROBERT GOTTSCHALK
Attesting Officer  Acting Commissioner of Pat